73-659 SR CROSS REFERENCE SEARCH ROOM

XR 3,326,036

June 20, 1967 C. H. HOEPPNER 3,326,036

APPARATUS FOR NOISE EVALUATION

Filed May 25, 1964 10 Sheets-Sheet 4

June 20, 1967 C. H. HOEPPNER 3,326,036

APPARATUS FOR NOISE EVALUATION

Filed May 25, 1964 10 Sheets-Sheet 5

June 20, 1967 C. H. HOEPPNER 3,326,036

APPARATUS FOR NOISE EVALUATION

Filed May 25, 1964 10 Sheets-Sheet 6

June 20, 1967 C. H. HOEPPNER 3,326,036

APPARATUS FOR NOISE EVALUATION

Filed May 25, 1964 10 Sheets-Sheet 7

June 20, 1967 C. H. HOEPPNER 3,326,036

APPARATUS FOR NOISE EVALUATION

Filed May 25, 1964 10 Sheets-Sheet 8

United States Patent Office 3,326,036
Patented June 20, 1967

3,326,036
APPARATUS FOR NOISE EVALUATION

Conrad H. Hoeppner, Melbourne, Fla., assignor to Dana Corporation, Toledo, Ohio, a corporation of Virginia
Filed May 25, 1964. Ser. No. 369,684
15 Claims. (Cl. 73—67)

This invention relates to apparatus for noise evaluation in general, and in particular, to a method and means of noise evaluation in which a specific varying frequency in a random noise frequency background is to be measured.

Scientific evaluation of industrial noise sources has long been desired, particularly for applications when more than one noise source prevails, such as complex machinery involving multiple gear trains and other noise-producing mechanisms. For example, the problem of axle noise in automobiles has become increasingly acute during the past several years. The importance of this problem has grown with the advancement in the sound-proofing of automobile bodies, unit construction and noise deadening of other components in automobiles so that the axle noise has become more apparent. The solution to the axle noise problem may come in the form of noise reduction through gear design and isolation. However, such a solution cannot be scientifically approached until there is available a means for separating the axle noise from the other random noise and measuring or metering such axle noise with a great degree of accuracy.

It is, accordingly, an object of this invention to provide an improved apparatus for noise evaluation.

It is a further object of this invention to provide an improved means for noise evaluation in which the equipment for same is small, portable and will give a direct scale reading proportional to the noise heard by the user. In the instance of axle noise this would be the noise heard in the passenger compartment of an automobile by the driver and passengers.

The present invention is illustrated in a system for evaluating gear and axle noise in an automobile. The system features and r.p.m. pickup which generates a voltage with magnitude and frequency respectively proportional and corresponding to the speed of the drive-shaft of the automobile. This voltage is conditioned as to magnitude and frequency by a tooth multiplier and then by counter flip flops so as to yield frequencies corresponding to the particular "mesh point" frequency of the spur gears driving the axle and, the second and third harmonics thereof. This conditioned signal is mixed with the heterogenous signals of a microphone and/or accelerometer as an input to a phase detector gating means. In accordance with the coincidental polarities, the phase detector will pass signals that have frequencies identical to those instantaneously generated by the flip flops of the counter. That is, a method of noise evaluation is utilized which comprises the steps of picking up a noise signal which includes random noise frequencies and a specific varying frequency that is to be measured, generating a gating signal of substantially the same varying frequency as the specific frequency to be measured, and mixing the noise signal and the gating signal in a gating or phase detector circuit to pass a specific varying frequency that is desired to be measured.

Other objects, features and advantages of the present invention will become apparent when the following description is taken in conjunction with the accompanying drawings, in which:

FIG. 1*a* is the block diagram illustrating a system embodying the features of this invention;

FIG. 1*b* is a schematic diagram representing the application of the system to an automobile to measure axle noise;

Figure 1A:
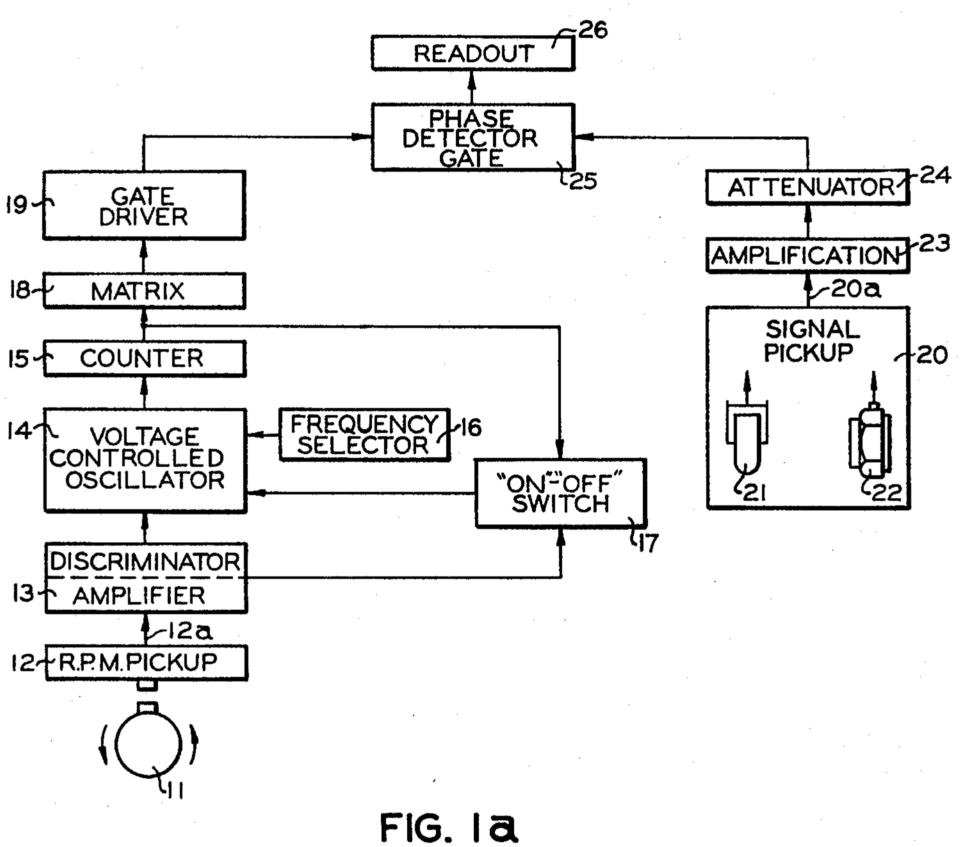
Figure 1B:
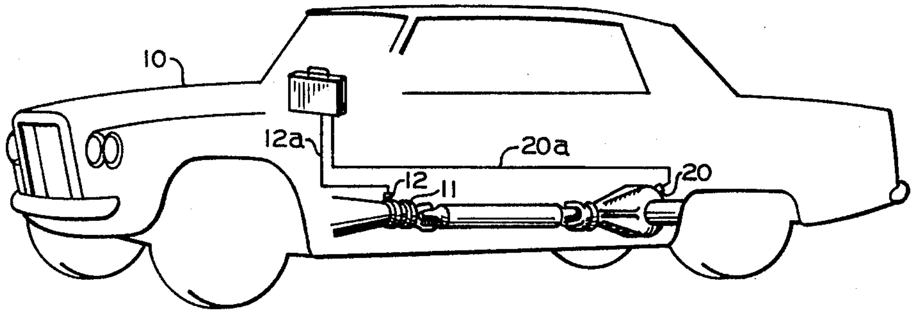

Referring to FIG. 1*a* it is to be noted that there are two inputs to the system. The first input is a magnetic pickup 12 from the rotating drive shaft 11. The second input 20 is the output signal from a microphone 21 and/or an accelerometer 22. The magnetic pickup 12 provides a trigger pulse which initiates events that sample the noise signal at appropriate times to read only the frequencies desired. The magnetic pickup input circuit may handle either a sharp pulse trigger or a sine wave and produce from it the correlating events. The noise signal input is designed to handle either a piezoelectric accelerometer or a crystal microphone, is conducted via a low noise cable **20*a* to an amplifier section 23, and is compensated with a variable attenuator 24** to provide a flat or desired frequency response.

The signal from the r.p.m. pickup 12 is conducted via shielded cable **12*a* to an amplifier and discriminator section 13. The voltage output from section 13 is fed to a voltage controlled oscillator 14. A frequency selector or multiplier 16 is connected to control the curve on which the oscillator 14 is operating. The output from the oscillator 14 is connected to a counter 15. The "on-off" switch 17 is responsive to an input trigger pulse to turn the oscillator "on" and is also responsive to a predetermined count in the counter 15 to turn the oscillator "off." A matrix 18 combines output states of the counter 15 to provide signals for the gate driver 19. The gate driver 19 provides positive and negative gating signals for the phase detector gating circuit 25**.

In general the system operates as follows. The magnetic pickup is first amplified and shaped through two stages of amplification and fed to a bistable electronic switch which triggers rapidly upon the receipt of each pulse or at the crossover of a sine wave input. The bistable electronic switch feeds a saw tooth generator which generates a voltage that is proportional to the period of the incoming signal, thereby providing a discriminator action in converting frequency to voltage. The peak of this voltage is fed throguh an emitter follower to a diode rectifier and filter which provides a smooth voltage that is in turn fed to a voltage controlled oscillator. The voltage controlled oscillator is adjustable to operate in this embodiment at 128 times the incoming frequency in position No. 8 which corresponds to 8 teeth on the spur gear, up to 304 times the incoming frequency which corresponds to 19 teeth on the spur gear. In this discriminator-voltage controlled oscillator circuit, parts are selected so that the output frequency tracks accurately the input frequency over its entire range of variation. Furthermore, the circuit responds quickly to any change of the input frequency such that the output frequency is corrected for every cycle of the input. The output of the voltage controlled oscillator is differentiated into sharp pulses to feed a scale of 16 binary counter. After the binary counter has received 16 pulses its output activates an "on-off" switch which acts to turn off the voltage controlled oscillator. During the interval of receiving 16 counts the scale of 16 binary counter feeds a diode matrix which selects the 16 discrete states of the counter and makes gates therefrom. Inasmuch as the beginning of the voltage controlled oscillator may be disturbed slightly in frequency the first four counts of the counter are not used in the present embodiment in providing output gates but rather the last 12 gates are selected for operation of the phase detectors.

By proper choice of the diode matrix gates in both duration and timing a single phase detector may be gated to indicate both the fundamental and third harmonic. Because it is a phase detector its output depends not only on the amplitude of the input signal but upon its phase. In this particular instance, however, phase indication is not desired. Consequently, a second phase detector is used with its gates delayed 90° for the first harmonic and 270° for the third harmonic from the first phase detector. Output from the two phase detectors is then added and mixed such that the final output approaches the square root of the sum of the squares of the two individual outputs which is the proper indication of amplitude irrespective of its phase.

For second harmonic of the signal, gates from the diode matrix are chosen to correlate with it in each of the two phases as described above. The outputs from the four phase detector gates are fed through diodes to a metering circuit in a manner such that the greatest signal causes the meter to read.

The acoustic input from the signal pickup from either the microphone or the accelerometer reaches the phase detector gate through a separate amplifier. Since the output of the phase detector is proportional to or a function of frequency, because of its smoothing filter, the gain of the input amplifier is made to roll off with frequency to provide proper compensation. The input transformer and the first two stages of gain provide amplification and proper compensation. An attenuator follows these stages to provide additional compensation for using a microphone and an accelerometer interchangeably. The output of the accelerometer is considerably greater than the output of the microphone. The attenuator also provides positions to further attenuate high frequencies to approximate the sensitivity of the human ear. The human ear is more sensitive to high frequencies than low in the operating arrangement of this equipment. An additional amplifier and emitter follower follow the attenuator to feed the signal to a phase-discriminatory transformer of the phase detector gate. The audio signal appears across the entire secondary of the phase-discriminator transformer and the correlator signal is fed to the secondary center tap. Diode peak riders on the output of the secondary, aligned in opposite polarity, deliver positive voltage peaks and negative voltage peaks to the opposite ends of the filter and resistance divider. If the correlating signal was not fed to the center tap of the transformer, an audio signal would cause the positive and negative voltages produced by the diode rectifiers to increase or decrease in the same amount. Since output is taken off at the center tap of the resistance divider there would be no change. Consequently, there would be no voltage passed on to the meter circuit and there would be no reading. If, on the other hand, the positive and negative pedestals of the correlating voltage are added in phase with the audio voltage the positive pedestal would add to the positive wave form on one side of the secondary and the negative pedestal would substract from the positive wave form on the other side of the secondary to produce an increase in positive voltage and a decrease in negative voltage. Consequently, the center tap would shift in voltage in the positive direction to cause a meter reading. It is desired that the meter read in only one direction regardless of the phase relation between the audio signal and the correlated or gating signal. In order to do this a second set of diodes, filters and resistance dividers is added, with the diodes reversed over the first set. This will produce a negative output and it is fed to the other side of the metering circuit. All of the phase detector discriminators are connected together through diodes such that positive output goes to one side of the meter and negative output goes to the other. In this way the meter reads in one direction regardless of the phase of the incoming signal.

Figure 2:
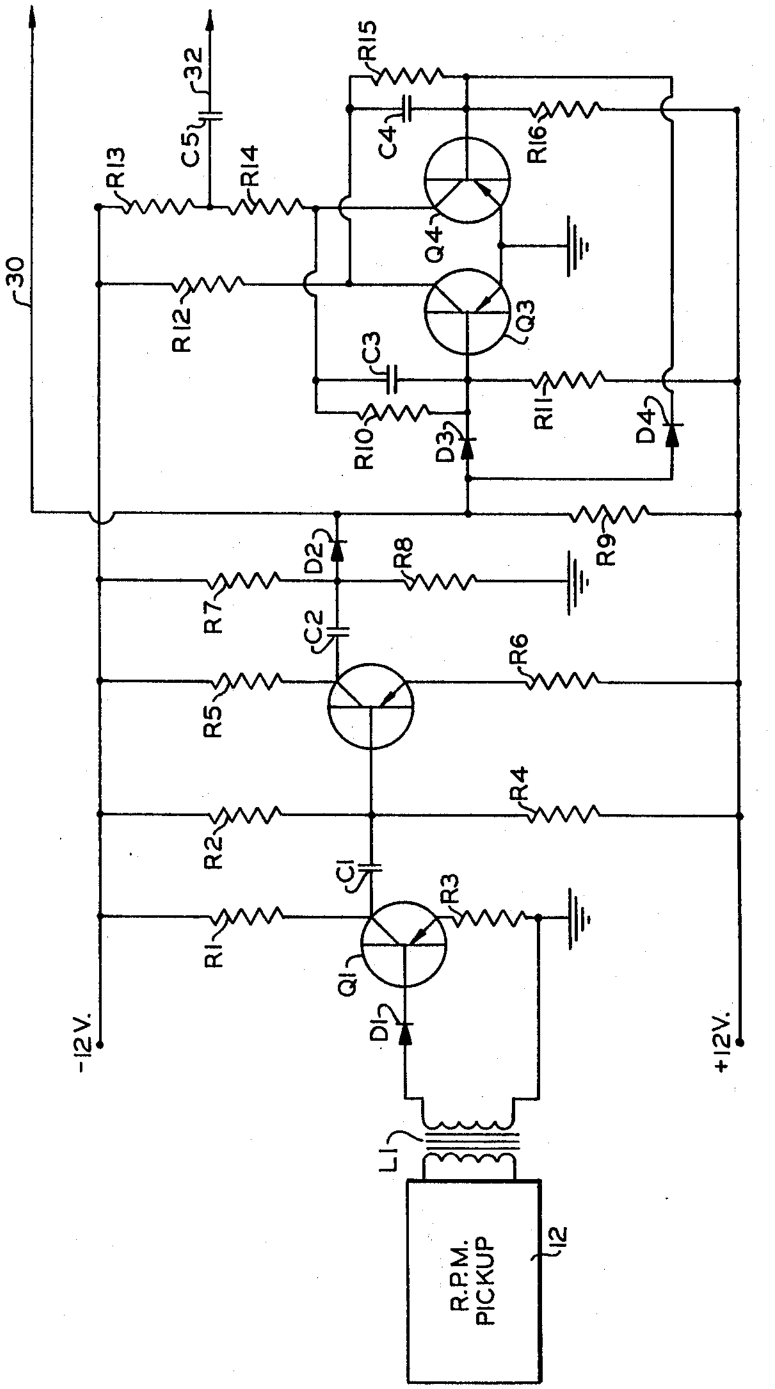
FIG. 2 is a schematic circuit diagram of the r.p.m. or trigger pulse pickup means and amplification and wave shaping means.

Referring to FIG. 2 there is illustrated a r.p.m. pickup 12 which may pick up trigger pulses from a magnet mounted on the driveshaft 11. It is to be noted that other pickup means are included within the scope of this invention, for example, a radio transmitter housed inside the driveshaft with a polarized antenna pickup. The pickup coil of the transformer L1 may advantageously be a 5000 turn coil. The trigger pulse is taken from the secondary winding of the transformer L1, rectified through biasing diode D1 and amplified through two stages of amplification by transistor amplifiers Q1 and Q2. Amplifier Q1 is normally cut off until the trigger pulse arrives which takes the amplifier Q1 all the way to saturation. Capacitance C1 and resistor R4 differentiate the output from the collector electrode of Q1 and applies the signal to the base of amplifier Q2. The output of Q2 is the same wave form as received at its base, except inverted and amplified. The output of amplifier Q2 is transmitted via coupling capacitor C2. The resistors R7 and R9 set a bias on diode D2 so that on the cathode side of D2 only a positive going pulse results. This positive going pulse causes the bistable comprising the transistors Q3 and Q4 to flip in one direction. This positive going pulse from diode D2 is also transmitted via lead 30 to the base electrode of transistor Q22 in FIG. 5 causing transistor Q22 to be shut off. When transistor Q22 is turned off its output through diode D17 and lead 31 to the voltage controlled oscillator comprising the transistors Q10 and Q11, in FIG. 3 to start oscillating. The positive going pulse on lead 30 also cuts Q21 "off" and turns Q20 "on" in the bistable electronic switch in FIG. 5.

Figure 3:
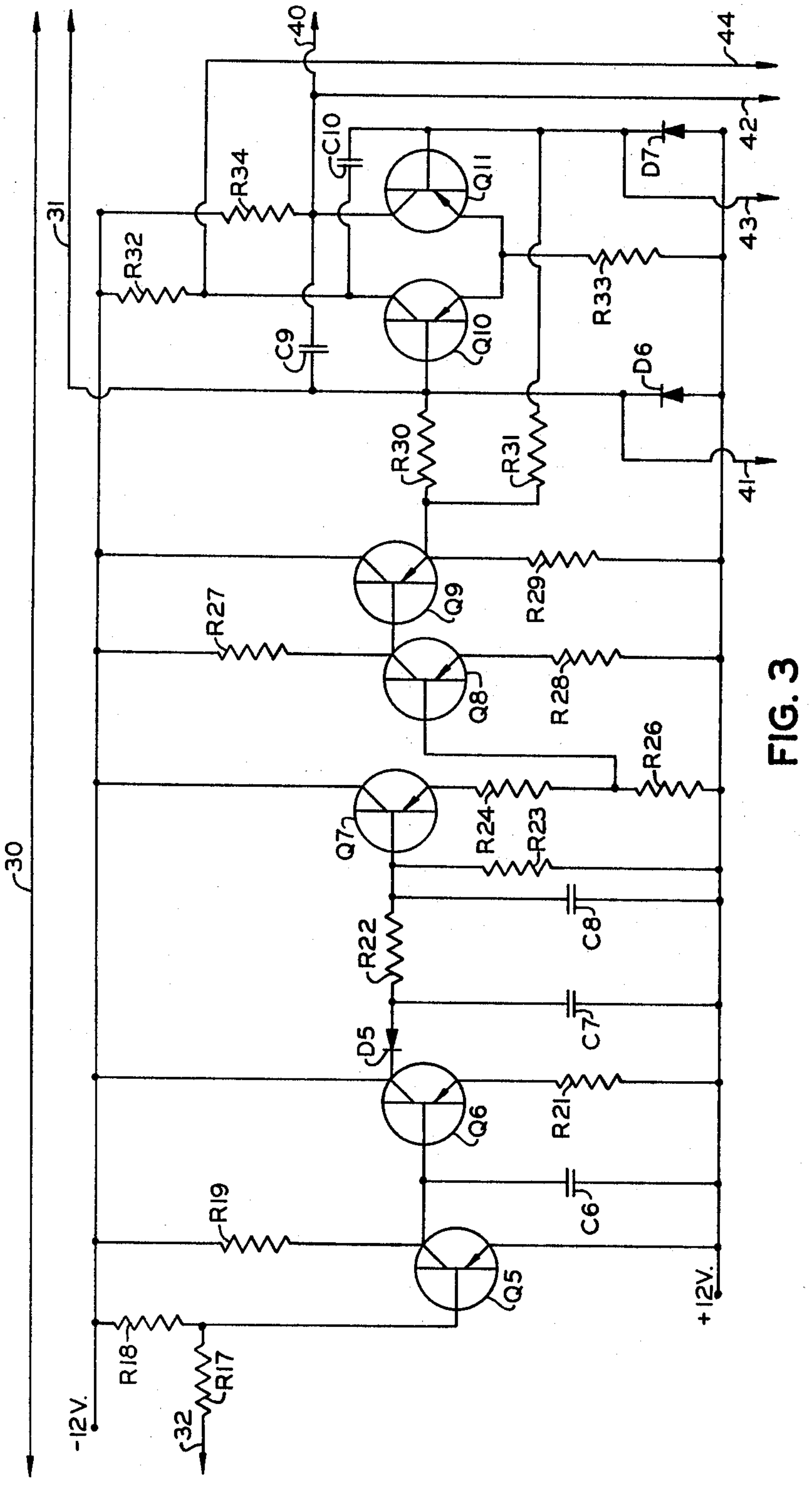
FIG. 3 is a schematic circuit diagram illustrating a saw tooth wave generator and a voltage controlled oscillator utilized in this invention.

Referring to FIG. 3 the output from the bistable comprising transistors Q3 and Q4 through coupling capacitor C5 and lead 32 to the base electrode of transistor Q5 causes a saw tooth wave generator which comprises the transistor Q5 and the capacitor C6 to start charging. This saw tooth generation will continue in operation and charge until a second trigger pulse comes in from the r.p.m. pickup 12 and turns Q5 on to permit the discharge of capacitor C6.

An emitter follower section including transistor Q6 functions to unload the saw tooth generator Q5, C6 and to carry the saw tooth wave to the iode rectifier and filter section following. The diode rectifier and filter section comprises the diode D5, the capacitors C7 and C8, and the resistance R22. This filtering and rectifying section supplies a D.C. voltage output which is a measure of the difference in peak levels between the lowest frequency and the highest frequency of the trigger pulse inputs. The output from the diode rectifier and filter section is fed through an emitter follower transistor Q7 which amplifies the voltage level received at the base of Q7. An amplifier transistor Q8 and an emitter follower transistor Q9 transmit the signal from the emitter follower section Q7 to the voltage controlled oscillator. The emitter follower transistor Q9 unloads the preceding stage and adjusts the bias on the following stage. The voltage level from the transistor Q9 is transmitted to the base electrodes of the transistors Q10 and Q11 of the voltage controlled oscillator via resistors R30 and R31 to control the oscillation frequency.

Figure 4:
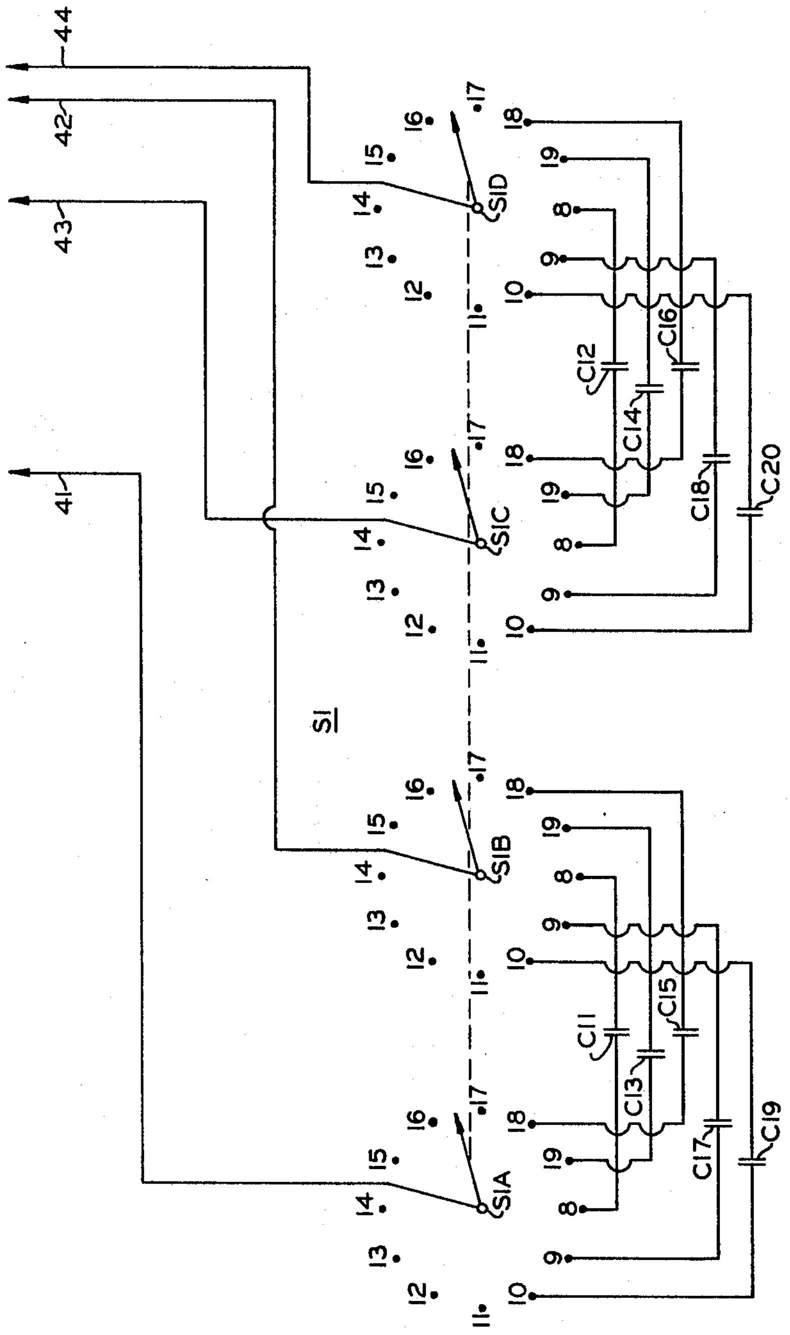
FIG. 4 is a schematic circuit diagram of a frequency multiplier selector switch adapted to provide a family of operating curves for the voltage controlled oscillator of FIG. 3.

Referring to FIG. 4 there is shown a switching means S1 having four sections S1A, S1B, S1C and S1D. Each of the sections has 12 positions numbered 8 to 19. Pairs of capacitances are connected between corresponding positions on S1A and S1B and between corresponding positions between S1C and S1D. The rotatable contacts of sections S1A and S1B are connected by leads 41 and 42 to the base electrode of transistor Q10 and the collector electrode of transistor Q11, respectively. Similarly, the rotatable contacts of sections S1C and S1D are connected by leads 43 and 44 to the base electrode of transistor Q11 and the emitter electrode of Q10, respectively.

It may thus be seen that since the four rotatable contacts of the switching means S1 are ganged together that moving the contacts from position to position will vary the capacitance coupling of the voltage controlled oscillator and will therefore vary the operating curve of the oscillator. For the purposes of clarity only a few of the positions have capacitances shown connected therebetween, but it is to be noted from the following table the capacitances that may be used between all of the positions.

CAPACITANCE VALUE IN MICROFARADS

| Position | S1A–S1B | S1C–S1D |
|---|---|---|
| 8 | .021 (C11) | .021 (C12). |
| 9 | .016 (C17) | .02 (C18). |
| 10 | .016 (C19) | .015 (C20). |
| 11 | .010 (not shown) | .02 (not shown). |
| 12 | .012 (not shown) | .012 (not shown). |
| 13 | .012 (not shown) | .011 (not shown). |
| 14 | .0105 (not shown) | .011 (not shown). |
| 15 | .010 (not shown) | .010 (not shown). |
| 16 | .006 (not shown) | .006 (not shown). |
| 17 | .006 (not shown) | .005 (not shown). |
| 18 | .005 (C15) | .0044 (C16). |
| 19 | .007 (C13) | .008 (C14). |

Therefore the voltage controlled oscillator Q10, Q11 has available a frequency multiplier or selector which can provide a family of frequency curves upon which the oscillator may operate. Once an individual curve has been selected by the switching means S1 then the signal coming from emitter follower transistor Q9 will determine where on the curve selected the oscillator will operate.

Figure 5:
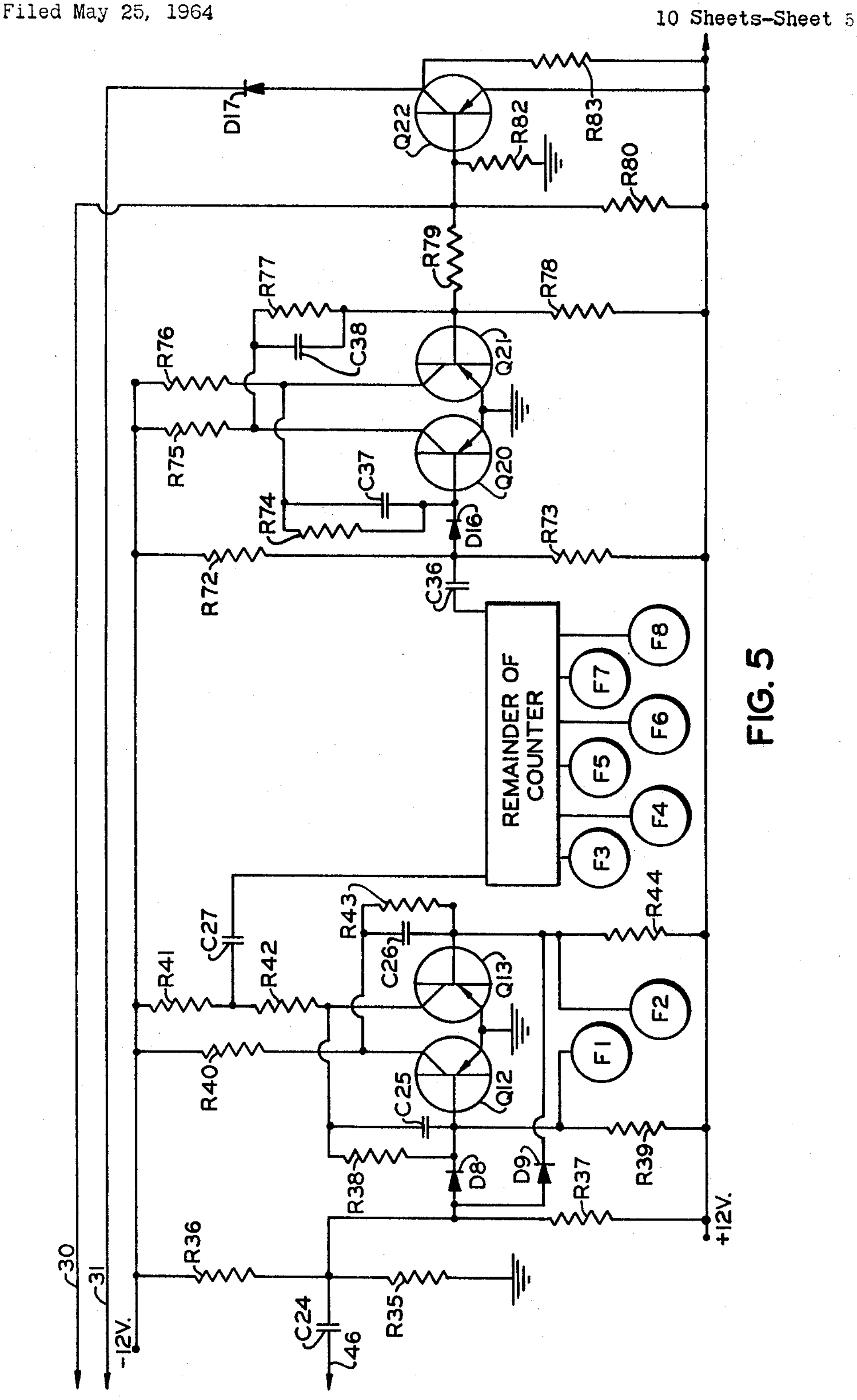
FIG. 5 is a schematic circuit diagram of a counter adapted to receive the output of the apparatus of FIG. 3 and an "on-off" switching means for controlling the operation of the oscillator of FIG. 3.

The output from the voltage controlled oscillator Q10, Q11 via lead 46 is differentiated by capacitance C24 and resistances R35 and R36 to shape the pulses to provide a good trigger for the counter shown in FIG. 5.

The circuit of the first section Q12, Q13 of the binary counter is illustrated and the remaining three substantially identical sections are indicated diagrammatically. The counter includes four sections connected to provide a binary count from 1 through 16. Its output states are available at terminals F1 through F8. After the counter counts 16 the 16th pulse from the counter output via capacitance C36 flips the electronic switch Q20, Q21 and turns transistor Q22 "on." When transistor Q22 conducts the signal is fed back via lead 31 to the voltage controlled oscillator Q10, Q11 in FIG. 3 and turns the voltage controlled oscillator "off."

Figure 6:
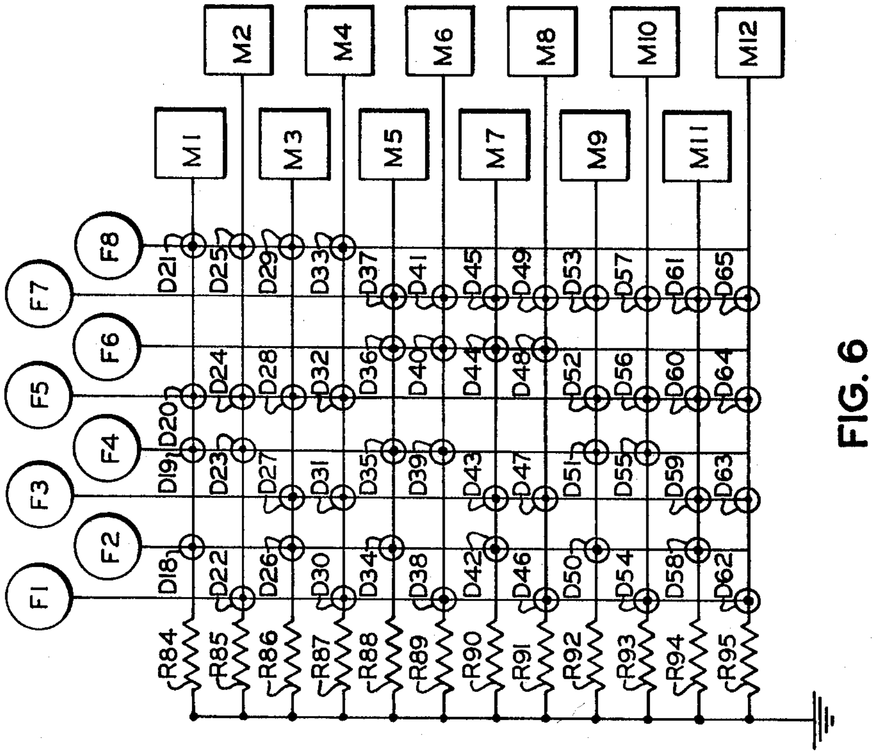
FIG. 6 is a schematic circuit diagram of a diode matrix to receive the output of the counter of FIG. 5.
Figure 7:
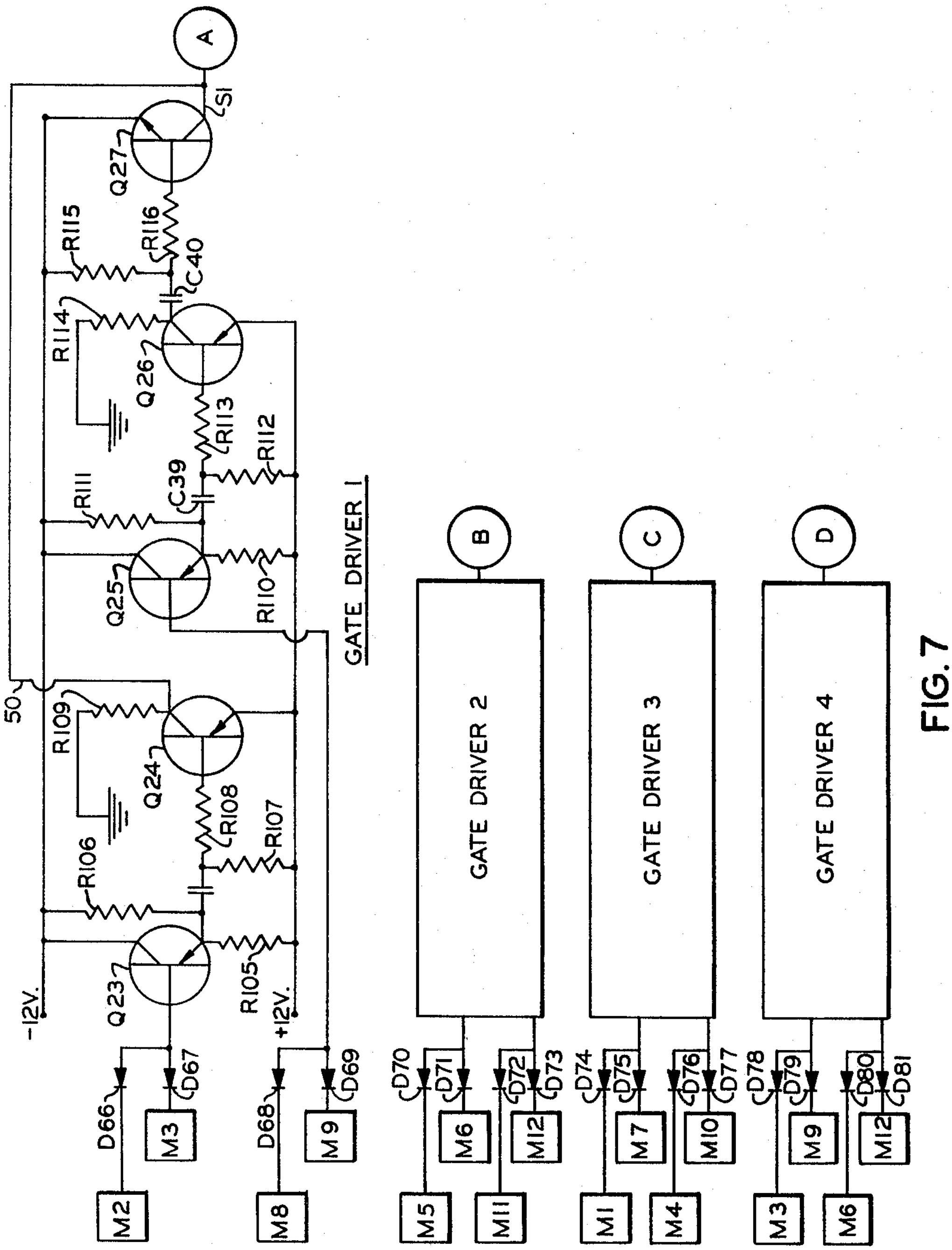
FIG. 7 is a schematic circuit diagram of a first gate driver circuit and block diagram representations of three other gate driver circuits adapted to be connected to the matrix illustrated in FIG. 6.

During this interval the counter has been producing an output to the diode matrix illustrated in FIG. 6. The diode matrix may be conventional in construction. That is, the vertical leads from terminals F1 through F8 may define an upper plane of the three-dimensional configuration, while horizontal leads from terminals M1 to M12 form a lower plane of the configuration. Diodes D18 to D65 are connected between the leads in the upper plane and the leads in the lower plane at the intersections noted in FIG. 6 to select the appropriate pulse times and durations. The diode matrix of FIG. 6 is connected along with the sampling and isolation diodes D66 through D81 to provide negative pulses to the gate drivers 1 through 4 at appropriate times. Each gate driver is divided into a positive gate section and a negative gate section. For emample, in gate driver 1 the positive gate section comprises transistors Q23 and Q24. When a negative pulse is received at either terminal M2 or M3 it is amplified by transistor Q23 and amplified and inverted by transistor Q24 to provide a positive gate signal via lead 50 to terminal A. Similarly, when a negative pulse is received at either terminal M8 or M9 it is amplified by transistor Q25, amplified and inverted by transistor Q26 and further amplified and again inverted by transistor Q27 providing a negative gate signal on lead 51 to terminal A. Similarly, gate drivers 2, 3 and 4 provide gate signal outputs to terminals B, C and D.

Figure 10:
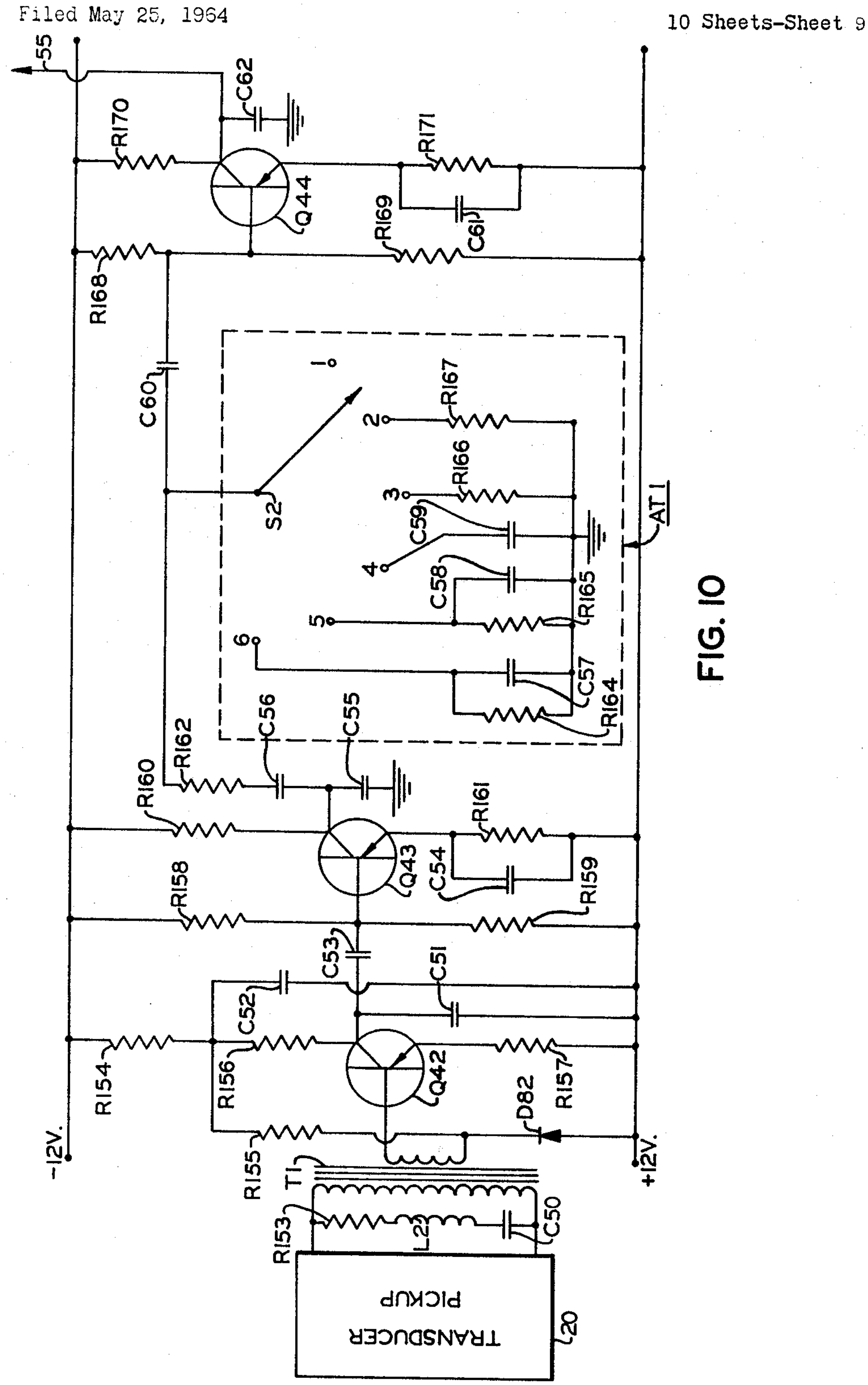
FIG. 10 is a schematic circuit diagram of a transducer pickup means for the noise signal, a noise signal amplifier and an attenuator circuit means.

Referring to FIG. 10 there is illustrated the transducer pickup 20 which picks up a noise signal with all frequencies and amplitudes therein. It is desired to isolate the axle noise frequencies from the random noise of the tires, the road, the wind, etc. Transistor Q42 receives the noise signal from the secondary of the transformer T1 and amplifies it. The capacitance C51 connected on the output of transistor Q42 acts as a low pass or a high reject filter. Similarly, transistor Q43 again amplifies, with capacitance C55 acting as a low pass or high reject filter.

The attenuator AT1 comprises a switching means S2 having six positions. Position 1 is as shown empty and removes the attenuator from the circuit. Positions 2, 3, 4, 5 and 6 have various combinations of resistances, capacitances or RC circuits which may be connected in the circuit to affect both the gain and the frequency response of the signal coming in. As described hereinbefore the attenuator provides additional compensation for using either a microphone or an accelerometer as the transducer pickup 20, since the output of the accelerometer is considerably greater than the output of the microphone. The attenuator also provides positions to further attenuate high frequencies to approximate the sensitivity of the human ear, since the human ear is more sensitive to high frequencies than low in the operating range of the embodiment illustrated. As noted, this compensation may be used if desired or switched out of the circuit.

An additional transistor amplifier Q44 provides the final amplification in the signal amplifier with capacitance C62 acting as a final high frequency rejection. The output from the signal amplifier is fed via lead 55 to the input of phase detectors PD1, PD2, PD3 and PD4. The signal amplifier has amplified all the signal picked up including the background noise with the exception that the capacitances C51, C55 and C62 have cut out some of the undesirable high frequencies.

Figures 8, 9:
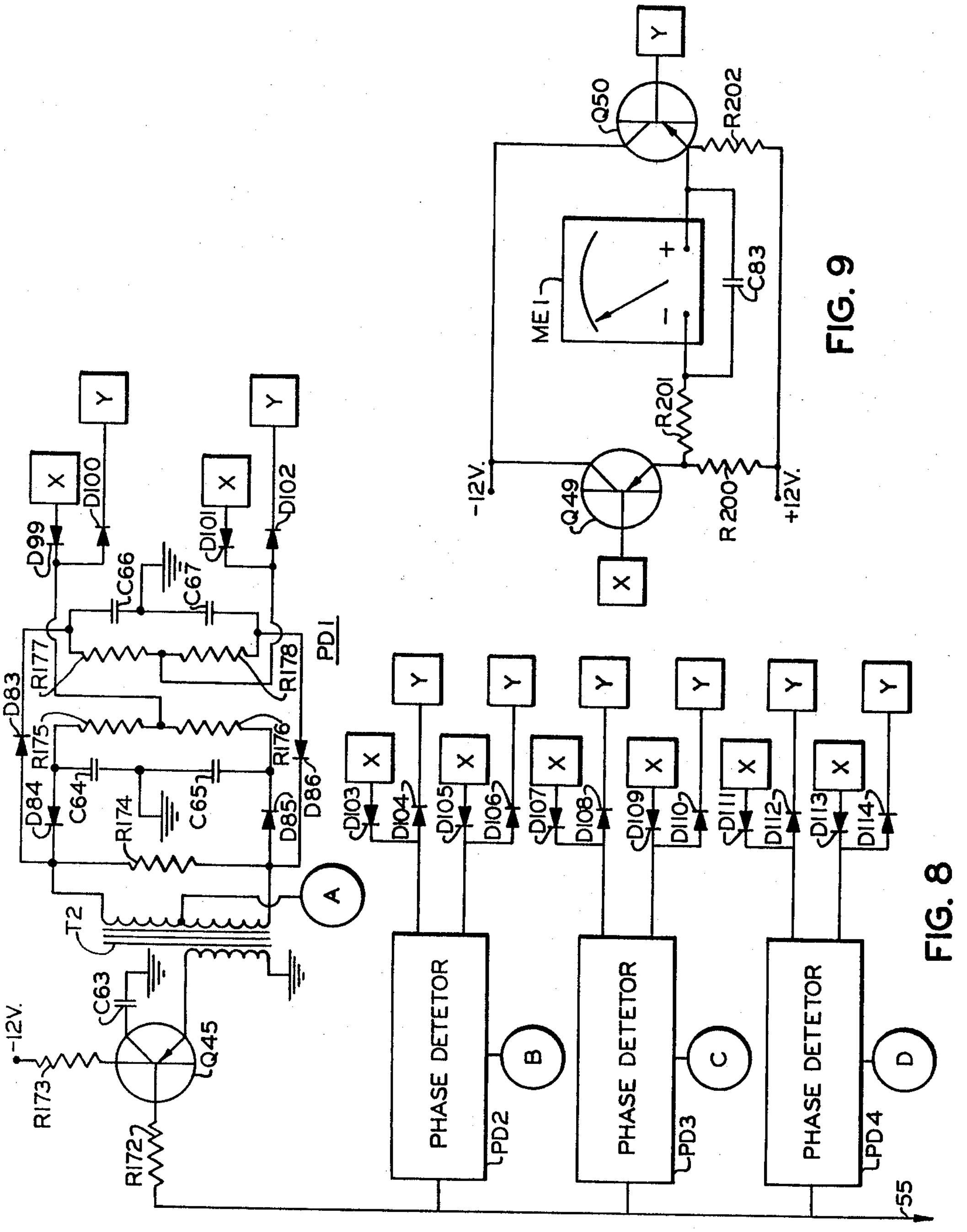
FIG. 8 is a schematic circuit and block diagram representation of phase detector circuits adapted to receive gating signals from the apparatus illustrated in FIG. 7.
FIG. 9 is a schematic circuit diagram of a readout or metering circuit adapted to receive an input from the phase detectors of FIG. 8.

Referring to FIGURE 8, an emitter follower section Q45 unloads the previous stage and provides the proper gain for input to the input transformer T2 of each phase detector gate PD1 through PD4. The gate signal from gate drivers 1 through 4 is fed into the phase detectors PD1 through PD4 via terminals A, B, C, D as shown. The gate signals and audio signals thus are mixed in the phase detectors PD1 through PD4. In accordance with the previous discussion there has to be a coincidence of both gate and audio signals for output from the phase detectors.

Figure 11:
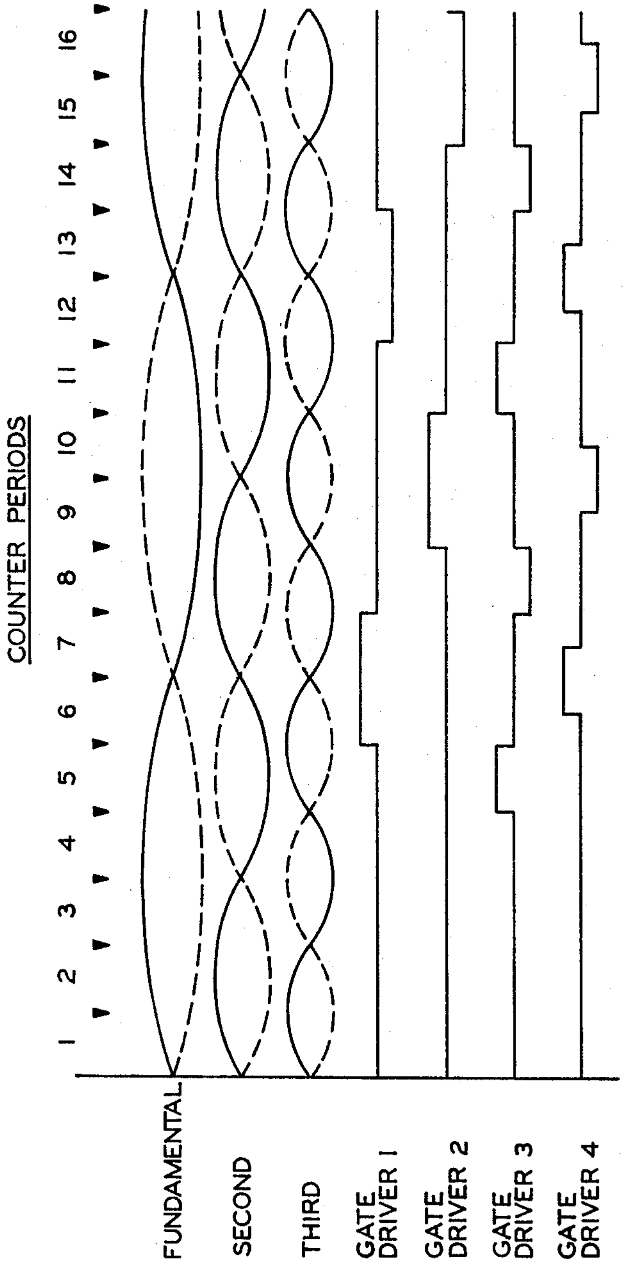
FIG. 11 is a graphic representation of wave forms appearing in the phase detector gating circuits of FIG. 8.

Referring to FIG. 11 the first three wave forms indicate the fundamental, second and third harmonics of the signal desired to be gated. As noted hereinbefore, the first four periods of the counter have been omitted as gates to avoid any possible disturbance of the oscillation. These four periods can be used, however, to note that if there are no gating signals present then there will be not output from the phase detectors of FIG. 8 to the metering circuit of FIG. 9.

The audio signal from lead 55 appears across the entire secondary of the transformer T2. The gating signal is fed to the secondary center tap from terminal A. Diode peak riders D84 and D85 on the output of the secondary, aligned in opposite polarity, deliver positive voltage peaks and negative voltage peaks to opposite ends of a filter and resistance divider which includes capacitances C64, C65 and resistances 175, 176. If the gating signal was not fed to the center tap of the transformer, an audio signal would cause the positive and negative voltages produced by the diode rectifiers D84 and D85 to increase or decrease in the same amount. Since an output is taken off at the center tap of the resistance divider R175, R176 there would be no change. Consequently, there would be no voltage passed on to the meter circuit of FIG. 9 and there would be no reading. If, on the other hand, the positive and negative pedestals of a gating signal (shown in FIG. 11) are added in phase with the audio voltage, the positive pedestal would add to the positive wave form on one side of the secondary and the negative pedestal would subtract from the positive wave form on the other side of the secondary to produce an increase in positive voltage and a decrease in negative voltage. Consequently, the center tap between resistances R175 and R176 would shift in voltage in the positive direction to cause a meter reading.

It is desired that if a meter is used in the readout circuit of FIG. 9 that the meter read in only one direction regardless of the phase relation between the audio signal and the gating signal. In order to do this a second set of diodes D83 and D86, a second set of filters and resistance dividers C66, C67 and R177, R178 is added with the diodes D83, D86 reversed over the first set. Consequently, the second set will produce an output that is negative and is fed to the other side of the metering circuit via terminals X. As will be noted in FIGS. 8 and 9 all of the phase detectors are connected together through mixing diodes D99 through D114 so that the positive output goes to one side of the meter, terminal Y, and the negative output goes to the other side, terminal X. In this way the meter reads in one direction regardless of the phase of the incoming signal. This circuit also allows the use of one meter for all four phase detectors instead of eight meters that read in different directions.

As noted, by proper choice of the diode matrix gates in both duration and timing a single phase detector PD1 may be gated to indicate both the fundamental and third harmonic (see the wave form for gate driver 1 in FIG. 11). Because it is a phase detector its output depends not only on the amplitude of the input signal but upon its phase. In this particular instance the phase indication is not desired. Therefore, a second phase detector PD2 is used with its gates delayed 90° for the first harmonic and 270° for the third harmonic from the first phase detector PD1. (Note the gating signals of gate driver 2 in FIG. 11.) The outputs from the phase detectors PD1 and PD2 are then added and mixed so that the final output approaches the square root of the sum of the squares of the two individual outputs which is a proper indication of amplitude irrespective of its phase.

For the second harmonic of the signal gates from the diode matrix are chosen to correlate with it in each of the two phases as described above and the gating signal wave forms are shown in FIG. 11 for the gate drivers 3 and 4.

The outputs from the four phase detector gates are fed through the mixing diodes D99 to D114 as noted through the metering circuit in FIG. 9 so that the greatest signal causes the meter to read. As the unit is illustrated it is not known whether the meter reading is a fundamental, the second or the third harmonic. A switch may be added to obtain this information.

Band width of the instrument is controlled by the response of the meter ME1. Capacitor C83 across the meter in conjunction with resistor R201 in series provides a time constant which limits meter response. By increasing the capacitor the meter response rate may be reduced and the effective band width of signal which is measured is narrowed. If the capacitance value is decreased the meter response increases and the band width signal is widened. A typical useful band width for meter reading in the present instance is four to five cycles per second. The invention thus acts as a tracking filter with a constant band width of five cycles per second and follows the incoming signal over a frequency change of 4 to 1. Its operating range in all possible positions and harmonics varies from 150 cycles per second to 5000 cycles per second.

There has thus been described and disclosed apparatus for noise evaluation which comprises means for picking up a noise signal which includes random noise frequencies and a specific varying frequency that is to be measured, means for generating a gating signal of substantially the same varying frequency of the specific frequency to be measured, and mixing circuit means connected to said pickup means for passing said specific varying frequency to be measured in response to an input of said gating signal. The generating means includes discriminator means responsive to a succession of trigger pulses and a voltage controlled oscillator means responsive to the discriminator means. Multiplier means are provided for selectively connecting components to the oscillator to vary the frequency curves of oscillation. A counter is responsive to the oscillator means. Switching means are provided for turning the oscillator "on" in response to a trigger pulse and turning the oscillator "off" in response to a predetermined count in the counter. The generating means further includes a matrix means connected to combine predetermined output states of the counter means to provide a gating signal. The mixing circuit means may comprise a phase detector gate means which receives the noise signal. The phase detector gate means is operative to pass the specific varying frequency which is to be measured in response to an input of a gating signal having substantially the same varying frequency.

Although a microphone and/or accelerometer has been shown for use as a transducer other transducers are also suitable for use in the invention such as a torsiograph, strain gages, etc.

The following table lists component values that may advantageously be used to obtain the desired functions.

*Resistances (K ohms)*

| | | | |
|---|---|---|---|
| R1 | 5.6 | R77 | 22 |
| R2 | 5.6 | R78 | 47 |
| R3 | .12 | R79 | 100 |
| R4 | 10 | R80 | 1.96 |
| R5 | 5.6 | R82 | 1000 |
| R6 | .12 | R83 | 1 |
| R7 | 68 | R84 to R104 | 27 |
| R8 | 10 | R105 | 5.6 |
| R9 | 56 | R106 | 6.8 |
| R10 | 22 | R107 | 5.6 |
| R11 | 47 | R108 | 1.8 |
| R12 | 3.3 | R109 | 5.6 |
| R13 | 1.5 | R110 | 5.6 |
| R14 | 1.8 | R111 | 6.8 |
| R15 | 22 | R112 | 5.6 |
| R16 | 47 | R113 | 1.8 |
| R17 | 4.7 | R114 | 5.6 |
| R18 | 100 | R115 | 10 |
| R19 | 41.3 | R116 | 12 |
| R21 | 10 | R153 | 150 |
| R22 | 22 | R154 | 1.8 |
| R23 | 56 | R155 | 5.6 |
| R24 | 6.07 | R156 | 5.6 |
| R26 | 3.3 | R157 | .12 |
| R27 | 6.8 | R158 | 470 |
| R28 | 1.2 | R159 | 10 |
| R29 | 10 | R160 | 5.6 |
| R30 | 6.8 | R161 | .12 |

*Resistances (K ohms)*—continued

| | | | |
|---|---|---|---|
| R31 | 6.8 | R162 | 6 |
| R32 | 5.6 | R164 | 3.9 |
| R33 | .068 | R165 | 10 |
| R34 | | R166 | 3.9 |
| R35 | 10 | R167 | 10 |
| R36 | 39 | R168 | 470 |
| R37 | 27 | R169 | 22 |
| R38 | 22 | R170 | 3.9 |
| R39 | 47 | R171 | .12 |
| R40 | 3.3 | R172 | 22 |
| R41 | 1.5 | R173 | 2.7 |
| R42 | 1.2 | R174 | 68 |
| R43 | 22 | R175 | 470 |
| R44 | 47 | R176 | 470 |
| R72 | 33 | R177 | 470 |
| R73 | 10 | R178 | 470 |
| R74 | 22 | R200 | 56 |
| R75 | 3.3 | R201 | 10 |
| R76 | 3.3 | R202 | 56 |

*Capacitances (microfarads)*

| | | | |
|---|---|---|---|
| C1 | .001 | C51 | .22 |
| C2 | .01 | C52 | 15 |
| C3 | .05 | C53 | 22 |
| C4 | .05 | C54 | 75 |
| C6 | 1 | C55 | .22 |
| C7 | 15 | C56 | 22 |
| C8 | 15 | C57 | .22 |
| C9 | .003 | C58 | .22 |
| C10 | .003 | C59 | .22 |
| C25 | 250 | C60 | 22 |
| C26 | 250 | C61 | 85 |
| C27 | .001 | C62 | .22 |
| C36 | .001 | C63 | 6 |
| C37 | 250 | C64 | 1 |
| C38 | 250 | C65 | 1 |
| C39 | 1 | C66 | 1 |
| C40 | 1 | C67 | 1 |
| C50 | .01 | C83 | 100 |

Diodes D1 to D5, and D8 to D82 may be 1N264's. Diodes D6 and D7 may be 1N482's. Diodes D83 to 114 may be RE70's. All transistors may be 2N404's except Q27 which may be a 2N169A. Inductance L2 may be 150 millihenries.

In conclusion, it is pointed out that while the illustrated examples constitute a practical embodiment of my invention, I do not limit myself to the exact details shown, since modification of the same may be made without departing from the spirit and scope of the invention.

Having described the invention, I claim:

1. Noise evalution apparatus comprising means for picking up a noise signal which includes random noise frequencies and a specific varying frequency that is to be measured; means for generating a gating signal of substantially the same varying frequency as said specific frequency to be measured including means for providing a succession of trigger pulses having a frequency which is a function of said specific frequency, discriminator means responsive to said trigger pulses, voltage controlled oscillator means responsive to said discriminator means, multiplier means for selectively connecting components to said oscillator means to vary the frequency curve of oscillation, counter means responsive to said oscillator means, and switching means for turning said oscillator on in response to a trigger pulse and turning said oscillator off in response to a predetermined count in said counter means; and mixing circuit means connected to said pickup means for passing said specific varying frequency to be measured in response to an input of said gating signal.

2. Apparatus as defined in claim 1 in which said gating signal means includes a matrix means connected to combine predetermined output states of said counter means to provide said gating signal.

3. Apparatus as defined in claim 2 in which said counter means comprises a plurality of bistable means each having a pair of outputs.

4. Apparatus for evaluating axle noise comprising transducer means for picking up axle noise of a varying frequency along with random background noise and converting said noise to an electrical noise signal; means for generating a gating signal of substantially the same varying frequency as the frequency of said axle noise; said generating means including means for providing a voltage proportional in magnitude to the speed of a drive shaft driving said axle, a voltage controlled oscillator responsive to said proportional voltage, a frequency multiplier means for multiplying the frequency of operation of said oscillator, counter means responsive to said oscillator means, and switching means responsive to said proportional voltage means for turning said oscillator on and responsive to a predetermined count in said counter means for turning said oscillator off; and mixing circuit means for passing said axle noise frequency in response to said gating signal.

5. Apparatus as defined in claim 4 in which said generating means includes a matrix means connected to combine predetermined output states of said counter means for use as a gating signal.

6. Apparatus as defined in claim 5 in which said mixing circuit means comprises phase detector means connected to receive said noise signal; and said generating means includes gate driving circuit means responsive to said matrix means for producing positive and negative gating signals; said phase detector means passing said axle noise component of said noise signal in response to receipt of said positive and negative gating signals.

7. Apparatus as defined in claim 5 in which said mixing circuit means includes an input transformer having a primary winding connected to receive said noise signal and a secondary winding with a center tap connected to receive said gating signal, diode peak riders connected in opposite polarity to said secondary winding, and a filter and resistance divider connected to said diode peak riders.

8. Apparatus as defined in claim 7 in which said mixing circuit includes a second set of diode peak riders connected to said secondary winding and aligned in opposite polarity to said first mentioned peak riders, and a second filter and resistance divider connected to said second set of diode peak riders.

9. Apparatus as defined in claim 8 in which a readout circuit having positive and negative input terminals is connected between center taps of said first and second resistance dividers, said negative input terminal being connected to both center taps via diodes aligned to pass only negative readings, said positive input terminal being connected to both center taps via diodes aligned to pass only positive readings.

10. Noise evaluation apparatus comprising means for picking up a noise signal which includes random noise frequencies and a specific varying frequency that is to be measured; means for providing a gating signal including means for generating a varying frequency signal which is a function of said specific frequency to be measured, oscillator means responsive to said functional frequency signal, counter means responsive to said oscillator means, and switching means for turning said oscillator on in response to a detection of said functional frequency signal and turning said oscillator off in response to a predetermined count in said counter means; and mixing circuit means connected to said pickup means for passing said specific varying frequency to be measured in response to an input of said gating signal.

11. Apparatus as defined in claim 10 in which said gating signal means includes a matrix means connected to combine predetermined output states of said counter means to provide said gating signal.

12. Apparatus as defined in claim 11 in which said mixing circuit means comprises phase detector means connected to receive said noise signal; and said generating means includes gate driving circuit means responsive to said matrix means for producing positive and negative gating signals; said phase detector means passing said axle noise component of said noise signal in response to receipt of said positive and negative gating signals.

13. Apparatus as defined in claim 11 in which said mixing circuit means includes an input transformer having a primary winding connected to receive said noise signal and a secondary winding with a center tap connected to receive said gating signal, diode peak riders connected in opposite polarity to said secondary winding, and a filter and resistance divider connected to said diode peak riders.

14. Apparatus as defined in claim 13 in which said mixing circuit includes a second set of diode peak riders connected to said secondary winding and aligned in opposite polarity to said first mentioned peak riders, and a second filter and resistance divider connected to said second set of diode peak riders.

15. Apparatus as defined in claim 14 in which a readout circuit having positive and negative input terminals is connected between center taps of said first and second resistance dividers, said negative input terminal being connected to both center taps via diodes aligned to pass only negative readings, said positive input terminal being connected to both center taps via diodes aligned to pass only positive readings.

References Cited

UNITED STATES PATENTS

| | | | |
|---|---|---|---|
| 1,992,453 | 2/1935 | Vincent | 73—69 |
| 2,915,897 | 12/1959 | Hoffmann | 73—71.4 |
| 2,970,469 | 2/1961 | Feldman | 73—67.2 |
| 3,029,385 | 4/1962 | Steinbrenner et al. | 73—67.2 |

OTHER REFERENCES

Lipmann, S. A., et al.: The Tread Noise Analyzer, Electronics, vol. 23, No. 11, November 1950, pp. 84–87.

RICHARD C. QUEISSER, *Primary Examiner.*

J. B. BEAUCHAMP, *Assistant Examiner.*